3,524,872
PRODUCTION OF METHYLENE BIS THIOCYANATE FROM AMMONIUM THIOCYANATE AND DIHALO METHANES

Joseph Matt, Chicago, Ill., assignor to Nalco Chemical Company, Chicago, Ill., a corporation of Delaware
No Drawing. Filed May 15, 1967, Ser. No. 638,624
Int. Cl. C07c *161/02*
U.S. Cl. 260—454           9 Claims

ABSTRACT OF THE DISCLOSURE

The present invention relates to an improvement in the general process of producing methylene bis thiocyanate (MT) by the following equation:

$$2NH_4CNS + CH_2X_2 \longrightarrow CH_2(SCN)_2 + NH_4X$$
$$(AT) \hspace{4em} (MT)$$

Applicant has now found that in dealing with the formerly non-preferred reactant ammonium thiocyanate, certain critical pH limitations are necessary in order to achieve operable or improved results as related to inhibition of polymer formation occurring in brown or red by-products. It has now been found that in using a process involving an added organic solvent for the dihalo methane (e.g., toluene), there is a critical initial pH range for conducting the reaction within the operable limits of a pH of 6.0–6.5, a preferred range of 6.2–6.5, and an optimum value of about 6.5.

Variation of critical process limitation, such as providing a completely aqueous solvent medium for the dihalomethane reactant during the reaction, is taught in the related copending application Ser. No. 604,122 filed Dec. 23, 1966, entitled "Method for Preparing Methylene Bis (Thiocyanate)" of Matt et al.

Relative to the background of the invention, it is to be noted that the product of the improved process of the present invention has evoked much interest due to its recently discovered propetries as an algaecide and as a bactericide for sulfate reducing bacteria. U.S. Pats. Nos. 3,252,855 and 3,300,375 to Wehner and Pat. No. 3,306,810 to Buckman et al. are all devoted to methylene bis thiocyanate and its activity as an industrial microbiocide. The patent and literature art point out that uniquely methylene bis thiocyanate is active against many different bacteria and algae in a concentration of only a few parts per milion which, considering its relatively low unit cost, makes it an ideal active compound for agriculture and other industrial compositions.

THE THIOCYANATE REACTANT

In general, the reaction may be viewed as between a thiocyanate MCNS or $NH_4CNS$ and a dihalo methane $CH_2X_2$. Alternatively, the latter may be expressed in nomenclature as a methylene halide. In the aforementioned copending application Ser. No. 604,122, it was noted that in the general thiocyanate reaction, the alkaline earth metals were inoperable or too expensive, and the ammonium thiocyanate reactant was grouped with the alkali metals, sodium and potassium, which were preferred. The preference of the alkali metals over ammonium thiocyanate as the reactant in an industrial process is strange since ammonium thiocyanate enjoys a favorable cost differential over the related sodium and potassium alkali metal salts. For example, recently a cost comparison showed the cost per pound mol of the ammonium salt was about two-thirds that of sodium thiocyanate. However, it is well known that ammonium thiocyanate presents some problems as a reactant due to polymer formation leading to poor yields and/or a "red gunk" product. This problem is partially solved by using freshly prepared ammonium thiocyanate to produce a clean, slightly off-white product of methylene bis thiocyanate (MT).

CONTROL OF THE pH

The instant reactant, $NH_4SCN$, much more than its alkali metal cousins, is susceptible to polymerization. It is believed that when the pH of the reaction mixture is less than 6 and to a certain extent less than 6.2, then ammonia is present in the reaction mixture as $NH_3$ or $NH_{4+}$ and the unstable HSCN polymerizes to a dark brown or red mass. The product yield is cluttered with a polyymeric by-product if the initial pH is below 6.

Conversely, where the pH is >6.5 ranging up into a basic medium, the polymer formation in the product is apparently chargeable to increased sensitiveness of the desired methylene bis thiocyanate and the unstable monohalide intermediate in the reaction medium also giving polymer by-product.

Thus, beset by different polymer formation problems either way on the pH scale, the present process has surmounted these difficulties by finding a critical initial pH to make available as a reactant the cheaper but previously scorned ammonium thiocyanate (AT).

It has been found that the reaction mixture containing an organic solvent for the dihalo methane is generally an acid pH medium of about 5. In order to practice the improvement of the present invention, this acid pH in the reaction mixture must be adjusted to the range pH 6.0–6.5, preferably to 6.2–6.5 and/or an optimum pH of 6.5 by the addition of a suitable base, such as KOH or NaOH or basic salt, such as $K_2CO_3$ or $Na_2CO_3$.

Table I below illustrates the reaction using the mixed dihalo methane, chlorobromomethane (MCB). The results are shown for three groups of tests showing the practice of the products and variation of pH.

The runs at initial pH of 6.2–6.5 uniformly showed a striking lack of polymer formation. The results also showed that where the pH shifted slightly upwardly from 6.5 towards a less acidic medium, there was medium-high polymer formation at 6.6.

The results further showed that the practice of the process at a neutral pH of 7 or alkaline in the range 7.0–8.0 uniformly led to unworkable high polymer product.

The results further showed that below an initial pH of about 6.0, there is a medium or high polymer formation which accentuates the narrow operational pH range for the process.

TABLE I.—REACTIONS OF CHLOROBROMOMETHANE (MCB) WITH AMMONIUM THIOCYANATE (AT) AT 90° C.
[pH vs. polymer formation in $NH_4SCN$, reaction]

| No. | pH | $NH_4SCN$ [1], percent |
|---|---|---|
| *Little polymer formation in MT product* | | |
| 808–16 | 6.5 | 50 |
| 808–18 | 6.2 | 50 |
| 808–19 | 6.5 | 50 |
| 808–21 | 6.5 | 50 |
| *Medium polymer formation in MT product* | | |
| 808–6 | 6.6 | 50 |
| 808–20 | 6.5 | 50 |
| 746–262 | 5.7 | 50 |
| 746–293 | 5.7 | 50 |
| *High polymer formation in MT product* | | |
| 808–5 | 7.8 | 50 |
| 808–8 | 6.6 | 50 |
| 808–9 | 6.6 | 66 |
| 808–12 | 6.6 | 66 |
| 808–30 | 7.0 | 50 |
| 808–48 | 7.4 | 50 |
| 746–242 | 5.7 | 50 |
| 746–255 | 5.7 | 50 |
| 746–260 | 5.7 | 50 |

[1] $NH_4SCN$ calculated as percent strength of aqueous solution.

NOTE.—The runs prior to 808–40 and the series 746 sequence used reagent grade AT. Others used technical grade AT.

THE DIHALOMETHANE REACANT AND REACTION SOLVENT

As taught in the copending application Ser. No. 604,122 noted above, the dihalomethane reactant for the production of methylene bis thiocyanate (MT) is preferably dibromomethane and this compound illustrates a preferred class of reactants where the halo constituents are similar. Also operable is diiodomethane. Operable, but not preferred, are mixed dihalomethanes, such as chlorobromomethane $CH_2ClBr$, and bromoiodomethane $CH_2BrI$ and chloroiodomethane $CH_2ClI$. In any event, it is desired that at least one, and preferably both, of the dihalo constituents be either bromo or iodo. In other words, dichloromethane and difluoromethane are not preferred. In the past, it has been customary to add an organic solvent to the methylene dihalide reactant to solubilize the reactant as well as the MT product. Since the particular AT reactant in this process is conventionally in aqueous solution, these prior art solvents were organic solvents which were hydrophilic in nature or miscible with water. Preferred known water-miscible solvents included acetone, methanol, dimethyl formamide, etc. A more extensive list appears hereinafter under "Purification and Recovery."

Although water-miscible solvents are generally operable in this process as added *reaction solvents*, as well as *purification solvents*, a group of sequestering solvents more amply described in the cofiled application of Joseph Matt entitled "Sequestering Solvent Process for Production of Methylene Bis Thiocyanate (MT)" are preferred as solvents during the reaction. Such an optimum reaction solvent is toluene, and other solvents of limited miscibility with water are preferred, such as aromatics, e.g., xylene, halogenated compounds, e.g., trichloroethylene, and less soluble ketones, e.g., methyl isobutyl ketone (MIBK). It is theorized that such a solvent protects the product from attack by acid, water and salt by a sequestering action during the reaction.

The volume of reaction solvent necessary in this process is governed in each case by its ability primarily to dissolve and preferably sequester the MT product. Generally a volume of reaction solvent of from 125–500 ml./mol of dihalomethane reactant is operable for the process. In the case of toluene used with chlorobromomethane, a ratio of 250 ml./mol gave optimum results.

REACTION TIME AND TEMPERATURE

The broad operational range of reaction time is 4–20 hours and typically, as with many organic reactions, lower temperatures used in the reaction require longer reaction time. However, by using the optimum conditions, a reaction time of 10–16 hours may be achieved.

In general, the temperatures employed in the present process when an organic reaction solvent is added are higher than in strictly aqueous solution. The process is operable from a minimum of about 75° C. and up to about 100° C. which is close to the decomposition temperature of MT (106° C.). An optimum temperature is about 90° C. and uniform heating achieved by stirring on a surrounding steam bath, is preferred to avoid unevenness caused by "hot spots."

MOL RATIOS

The formula for the present reaction is as follows:
$2NH_4SCN +$ alternatively $CH_2XY$ (mixed dihalo where X and Y are dissimilar halides and X or Y is preferably Br— or I—) or $CH_2X_2$ (dibromomethane etc.)$\rightarrow$ $CH_2(SCN)_2 + 2NH_4X$. Empirically, the above equation calls for 2 mols of $NH_4SCN$. Actually, to drive the reaction towards the right, a slight molar excess of ammonium thiocyanate is necessary and a somewhat greater excess is preferred. Where a similar dihalo methane is used, such as dibromomethane, an optimum mol ratio is 2.6 to 1, whereas with a mixed dihalo compound (i.e. chlorobromomethane) a 3.6 to 1 ratio of thiocyanate to dihalomethane is necessary to obtain an optimum yield of MT. Too much AT reactant clutters the MT product with an undesired excess of inorganic salts. Therefore, an operable molar range for the AT reactant is 2 and 4 moles per mole of organic halide reactant.

It has further been found that strength of solution of about 50% for the ammonium thiocyanate reactant is preferred as when the AT is made up with an equal weight of water.

Below about 40% AT aqueous strength of solution, the yields and reaction times are adversely affected. At 60% and above AT aqueous strength of solution, high polymer formation was observed even within the preferred initial pH range of 6.2–6.5.

The best results are obtained by use of reagent grade ammonium thiocyanate reactant (AT) although this is not required.

PURIFICATION AND RECOVERY

Where the product is fouled by polymer formation, inorganic salts, or when necessary, especially where mixed halides are used, the MT product may be recovered in pure form, preferably using a water-miscible purification solvent. Lower aliphatic alkanols are preferred and a 20% aqueous solution of isopropanol is the solvent of choice. The solvent/$H_2O$ ratio may vary from 1 to 10 to 10 to 1 with a preferred ratio of about 1 to 5. The permissible variation of solvents include other substantially water-miscible lower alkanols, such as methanol and n-propanol etc., as well as other classes of water-soluble solvents, such as ketones like acetone and methylethylketone (MEK) and amides like dimethyl formamide and N,N-dimethyl acetamide. When the preferred reactant $CH_2Br_2$ is used, the use of a purification solvent may often be omitted.

The limited miscibility solvents, such as toluene, which are preferred for the reaction state of the process, are operable but not preferred in the purification phase of the process. The theory of the divergent type of solvent used in the reaction phase is that a slightly miscible solvent, such as toluene, is utilized to sequester and protect the newly formed or nascent MT from heat and acid whereas, in purification, a water-miscible solvent, such as isopropanol, is used to guarantee maximum solubility for recrystallization purposes for the sparsely water-soluble MT.

Example 1.—Low polymer pH 6.5—Chlorobromomethane reactant (MCB)

A solution of 52 g. (0.4) mol of chlorobromomethane in 200 ml. of toluene was added to a solution of 101.2 g. (1.33 mol) of reagent grade ammonium thiocyanate, 1.0 g. of potassium iodide, and 6 drops of 33% potassium carbonate solution in 101 ml. of water, the pH of the aqueous phase being 6.5. This was stirred for 16 hours under reflux on a steam-bath.

After addition of 50 ml. of water, the mixture was filtered hot to give 1.25 g. of polymer. The toluene layer of the filtrate was combined with four 300 ml. hot toluene extracts of the aqueous layer. This solution, after treatment with 10 g. of Super-cel adsorbent, and filtering, concentrating and cooling deposited 25 g. of substantially pure methylene bis thiocyanate, M.P. (clear) 102° C. and 3.8 g. M.P. 100–102° C. clear. This was 55.5% of the theoretical amount. Polymer formation was negligible.

Purification by recrystallization from a 1:5 isopropanol: water solution gave a product of improved just off-white color.

Example 2.—Low polymer pH 6.2

Example 1 above was repeated with the change that the pH was adjusted to 6.2 instead of 6.5. The same procedure was followed with the same results. Polymer weight 1.5 g., product weighed 25 g.=48.2%.

Example 3.—High polymer pH 7.8

The proportions of Example 1 above were followed, but the pH was adjusted to 7.8. The identical procedure followed above gave only 5 g. of methylene bis thiocyanate, and 14.5 g. of polymer.

Example 4.—Low polymer pH 6.3—Dibromomethane reactant

A 50% by weight solution of 39.5 g. (0.52 mol) of ammonium thiocyanate was adjusted to pH of 6.5 with dilute NaOH solution and was stirred with a solution of 35 g. (0.2 mol) of dibromomethane in 100 milliliters of toluene at 90° C. for 16 hours. At the end of this period, 100 milliliters of cold water was added to the reaction mixture and the whole was chilled at 5° C. The crystals were filtered off and the toluene layer in the filtrate was evaporated separately to give further crystals. The solids thus obtained were dissolved in 6 parts of a solution of 20% by weight isopropyl alcohol, 80% by weight water. The hot solution was separated from insoluble polymer by filtration or alternatively by decantation, and the desired methylene bis thiocyanate appeared as white needles upon cooling the solution. The melting point of the product was 102–104° C. melting clear, indicating no inorganic thiocyanate present. The yield was 60.5 g. which was 63% of theoretical. The polymer formation was negligible.

Example 5.—High polymer pH 5

The procedure of Example 4 was repeated using the same reactants, molar ratios and solvents. In this case, the pH 5 of the reaction mixture was not raised by alkali addition. The yield was 36.5% of theoretical and the product was in the form of dark yellow crystals with a melting point of about 100° C. together with a large amount of polymer.

Example 6.—Low polymer pH 6.5—Dibromomethane reactant—Toluene reaction solvent A solution of 45.6 grams (0.6 mole) ammonium thiocyanate in an equal amount of water was treated with dilute NaOH solution until the pH had risen from 5 to 6.5. This was stirred at 90° C. on the steam-bath for 16 hours with a solution of 35 grams (0.2 mole) of dibromomethane in 100 ml. of toluene. One hundred ml. of cold water was then added to the reaction mixture, and the whole was cooled to 5° C. whereupon there appeared white needles of methylene bisthiocyanate, along with a small amount of dark polymeric material. Filtration removed these solids; separation and evaporation of the toluene layer of the filtrate afforded some more, darker material. The combined solids were heated with six parts of a solution of 20% by weight isopropyl alcohol and 80% by weight water until all except a small amount of dark polymeric material had dissolved. This was separated by decanting off the liquid portion and cooling it, whereby methylene bis thiocyanate separated as white needles and inorganic salts remained in solution. The yield of product was 20 grams, or 78% of theory. It melted at 103–105° C. Polymer yield was negligible.

Example 7.—Low polymer pH 6.2—Dibromomethane reactant—Methyl isobutyl ketone reaction solvent This experiment was conducted in an analogous way to Example 6 using 39.5 g. (0.52 mole) ammonium thiocyanate, neutralizing with sodium carbonate solution to pH 6.2, heating with 35 g. dibromomethane in 100 ml. methyl isobutyl ketone at 90° C. for 16 hours. A darker reaction mixture resulted than in Example 6. Yield was 15 g., 57.7%. Polymer yield was negligible.

Example 8.—Slight polymer pH 6.0—Dibromomethane reactant—Trichloroethylene reaction solvent An experiment was performed using the technique and scale of Example 7. The pH was shifted to 6.0 and trichloroethylene, a water-immiscible solvent, used as a reaction solvent. The reaction was carried out at 90° C. for 16 hours. There was some polymer formation which was slightly greater than which appeared in Examples 6 and 7.

I claim:
1. In the process of preparing and recovering methylene bis thiocyanate by reacting about 2–4 mols of aqueous ammonium thiocyanate with about 1 mol of a dihalo methane selected from $CH_2XY$ where X=I, Br, Cl, F and Y=I, Br, Cl, F and at least one X or Y must be I or Br in an organic solvent of limited miscibility with water at a temperature of about 75°–100° C. for about 4–20 hours and crystallizing the product, the step which comprises carrying out the reaction at an initial pH of about 6.0–6.5.
2. The process of claim 1 in which the reaction is carried out at an initial pH of about 6.2–6.5.
3. The process of claim 1 in which the reaction is carried out at an initial pH of about 6.5.
4. The process of claim 1 wherein the dihalomethane is dibromomethane.
5. The process of claim 1 wherein the strength of solution of the ammonium thiocyanate reactant is 40–60% aqueous.
6. The process of claim 1 wherein the strength of solution of the ammonium thiocyanate reactant is about 50% aqueous.
7. A process according to claim 1 wherein the reaction period is about 10–16 hours and the temperature is about 90° C.
8. A process according to claim 1 wherein the crystallizing and recovery of methylene bis thiocyanate is carried out in the presence of a water-miscible organic solvent and water.
9. A process according to claim 1 wherein the added organic solvent is toluene and crystallizing and recovery of methylene bis thiocyanate is carried out in the presence of isopropanol and water.

References Cited

UNITED STATES PATENTS

| 2,939,875 | 6/1960 | Floria | 260—454 |
| 3,300,375 | 1/1967 | Wehner | 260—454 XR |
| 3,433,737 | 3/1969 | Wehner | 260—454 XR |

LEWIS GOTTS, Primary Examiner

G. HOLLRAH, Assistant Examiner